(12) United States Patent
Pekkarinen et al.

(10) Patent No.: US 6,321,071 B1
(45) Date of Patent: Nov. 20, 2001

(54) TESTING IN AN RF COMMUNICATION SYSTEM

(75) Inventors: Jari Pekkarinen, Fleet (GB); Toni Neffling, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/359,728

(22) Filed: Jul. 22, 1999

Related U.S. Application Data

(63) Continuation of application No. PCT/EP98/04970, filed on Jul. 27, 1998.

(51) Int. Cl.[7] ................................................ H04B 1/04
(52) U.S. Cl. .................... 455/115; 455/423; 455/67.1; 455/67.3; 455/67.4
(58) Field of Search .................................... 455/115, 422, 455/423, 67.1, 67.3, 67.4, 67.5

(56) References Cited

U.S. PATENT DOCUMENTS

| | | |
|---|---|---|
| 4,365,346 | 12/1982 | Froese et al. . |
| 5,471,649 * | 11/1995 | Rees et al. ......................... 455/67.4 |
| 5,603,088 | 2/1997 | Gorday et al. . |
| 5,783,989 * | 7/2000 | Issa et al. ......................... 340/426 |
| 5,809,395 * | 9/1998 | Hamilton-Piercy et al. ......... 455/4.1 |
| 6,094,577 * | 7/2000 | Han ..................................... 455/424 |

OTHER PUBLICATIONS

Patent Abstracts of Japan vol. 010, No. 158 (E–409), Jun. 6, 1986 & JP 61–012140.

* cited by examiner

Primary Examiner—William Trost
Assistant Examiner—Congvan Tran
(74) Attorney, Agent, or Firm—Merchant & Gould P.C.

(57) ABSTRACT

A test method in an RF communication system. In the communication system, at least one RF communication channel lies about a known carrier frequency in an RF communication band. According to the method, a diagnostic signal is introduced into a circuit to be tested, such as a linear power amplifier, the diagnostic signal having an RF diagnostic frequency lying within the communication band. The diagnostic signal is down converted to an intermediate frequency for diagnostic purposes so that DSP is simplified. The diagnostic frequency is selected based on the known carrier frequency of the communication channel so that the communication channel is not down converted as an image band with the diagnostic signal.

12 Claims, 2 Drawing Sheets

TESTING IN AN RF COMMUNICATION SYSTEM

This application is a continuation of PCT/EP98/04970 filed Jul. 27, 1998.

The present invention relates to testing in an RF communication system, in particular in a mobile communication network where a base station communicates with a plurality of mobile stations (for example mobile telephones) using a plurality of communication channels within a communication band.

In the following, the present invention is discussed in the context of a transmitter at a base station which operates to transmit data to one or more mobile stations, each of which is equipped with appropriate receiving circuitry. It will be apparent however that the mobile stations are also equipped with transmission circuitry and that the base station is equipped with appropriate reception circuitry and that therefore the aspects of the invention discussed herein may be applied either in base stations or mobile stations as appropriate.

In addition, the invention is discussed herein in the context of wide band code-division multiple access (W-CDMA) communication. According to W-CDMA communication, data to be transmitted is generated in the form of a modulation signal which is modulated onto a selected carrier frequency at the transmitter. The carrier frequency with its modulation forms a transmission channel of a predetermined bandwidth centred about the selected carrier frequency. A predetermined transmission band is allocated for each transmitter within which the carrier frequencies and consequent transmission channels have to lie. A controller within the transmitter governs selection of appropriate carrier frequencies for transmission. The bandwidth of the transmission band and the bandwidth of the modulation signal for each transmission channel is governed by appropriate Standards. According to one Standard, a transmission band has a bandwidth of 60 MHz lying between 2.11 GHz and 2.17 GHz and the bandwidth of the modulation signal is 5 MHz.

There are many occasions when it is required to test transmission circuitry. One example would be a set-up or initialise phase of transmission circuitry required for processing the communication channels prior to transmission. Another example would be to monitor operation of the transmission circuitry during normal use. Yet a further example might be to diagnose faults in the transmission circuitry. For these and other similar test purposes, it is known to use a diagnostic signal which is introduced into the transmission circuitry, processed by the transmission circuitry and then further processed according to a diagnostic or test procedure.

It is clearly advantageous if the diagnostic signal lies at a frequency which is close to the normal operational frequency of the transmission circuitry. Thus, it is advantageous if the diagnostic signal lies at a frequency within the chosen transmission band within which the transmitter operates. However, for RF frequencies at the level exemplified above, or more generally in the range for example of 400 MHz to 2.4 GHz, it is difficult to carry out diagnostic or test procedures on a diagnostic signal because the frequency is too high for normal digital signal processing equipment to operate.

It is an object of the present invention to overcome these difficulties by allowing diagnostic or test procedures to be conducted at an intermediate frequency which is significantly lower than the RF frequencies utilised for transmission.

One problem which arises in attempting to achieve this objective is that a diagnostic signal which lies at a frequency within the transmission band cannot simply be down converted to a lower intermediate frequency. The reason for this is described with reference to FIG. 1. FIG. 1 is a diagrammatic frequency chart with the break in the horizontal axis indicating a change in frequency range from a low frequency of the order of 100 KHz or a few MHz to a high frequency range of the order of several hundred MHz to GHz. CB represents a communication band and LO represents a local oscillator signal which is used to down convert the communication band CB. The frequency difference A between the local oscillator signal LO and the communication band CB is selectable according to the desired intermediate frequency after down conversion. However, existing down conversion circuits down convert not only the communication band but also a so-called image band IB which is located a similar frequency distance A to the other side of the local oscillator signal LO. Thus, as the arrows in FIG. 1 indicate, not only the desired communication band, but also an undesired image band are simultaneously down converted to form the down converted band DB at the lower intermediate frequency.

Thus, if a diagnostic signal is placed within a communication band, an attempt to down convert it runs a risk of down converting a useful transmission channel which happens to lie in the image band during down conversion.

According to one aspect of the present invention there is provided a test method in an RF communication system in which at least one RF communication channel lies about a known carrier frequency in an RF communication band, the method comprising:

introducing into circuitry to be tested a diagnostic signal at an RF diagnostic frequency lying within the communication band, and down converting the diagnostic signal to an intermediate frequency for diagnostic purposes after processing by the circuitry to be tested, wherein the diagnostic frequency is selected based on the known carrier frequency of the at least one communication channel such that the communication channel is not down converted as an image band with the diagnostic signal.

The method is particularly applicable when operated at a transmitter when the diagnostic signal is introduced into transmission circuitry. In the example described herein, the transmission circuitry comprises a linear power amplifier which processes the at least one communication channel prior to transmission. The invention is particularly useful in this context because the linearity of a linearised power amplifier is designed to be optimized around the operational communication band. In that context, the diagnostic signal is removed from the communication band prior to transmission.

The test method can however also be operated at a receiver in a diagnostic environment wherein the diagnostic signal is received at receiving circuitry to be tested which also receives the at least one communication channel.

In the context of a diagnostic signal for a linear power amplifier, it is likely that a single frequency or pure tone will be used.

In the context of a diagnostic signal for receiving circuitry, it is likely that test data will be transmitted using an operational transmission channel of a predetermined bandwidth.

According to another aspect, the invention provides a transmitter for an RF communication system comprising:

transmission circuitry for processing communication channels within an RF transmission band prior to transmission;

a controller for selecting the carrier frequency of at least one communication channel for transmission, the carrier frequency lying within an RF communication band, said controller also being operable to select a diagnostic frequency within the RF communication band for introducing a diagnostic signal at the diagnostic frequency into the transmission circuitry for test purposes; and means for down converting the diagnostic signal to an intermediate frequency for diagnostic purposes after processing by the transmission circuitry wherein the diagnostic frequency is selected based on the known carrier frequency of the at least one communication channel such that the communication channel is not down converted with the diagnostic signal.

Preferably the controller also selects the frequency of a local oscillator signal used to down convert the diagnostic signal. This could however be selected by another part of the circuitry or could be preset. It is desirable however that it varies in dependence on the diagnostic frequency so that the downconverted intermediate frequency is fixed (being the difference between the diagnostic frequency and the local oscillator frequency).

When the diagnostic signal is used for a linear power amplifier, the transmitter can include circuitry for cancelling the diagnostic signal prior to transmission.

In a mobile communication environment, the transmitter includes means for modulating the selected carrier frequency with a modulation signal representing data to be transmitted. As already mentioned, the invention is particularly appropriate for use in a wide band CDMA environment.

According to a further aspect of the invention there is provided a test method in an RF communication system in which at least two RF communication channels respectively lying about known carrier frequencies are present in an RF communication band, the method comprising:

downconverting one of said RF communication channels to an intermediate frequency for diagnostic purposes using a downconverting signal, where the frequency of the downconverting signal is selected based on the known carrier frequencies of the communication channels such that the other communication channel is not downconverted with the downconverted communication channel as an image frequency.

For a better understanding of the present invention and to show how the same is to be carried into effect, reference will now be made by way of example to the accompanying drawings in which.

Figure 2:
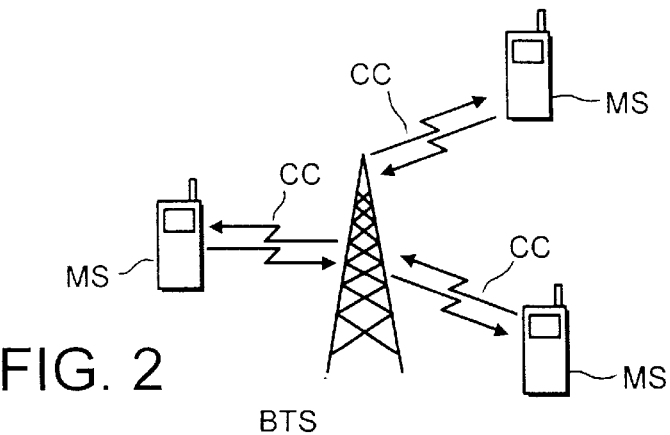
FIG. 2 is a diagram illustrating the context of the invention.

The present invention will be described in the context of a mobile communication environment as illustrated diagrammatically in FIG. 2. A base station BTS can communicate with a plurality of mobile stations MS via RF communication channels CC. The base station and mobile stations transmit data using transmission channels based on preselected transmission carrier frequencies onto which data to be transmitted is modulated.

Figure 3:
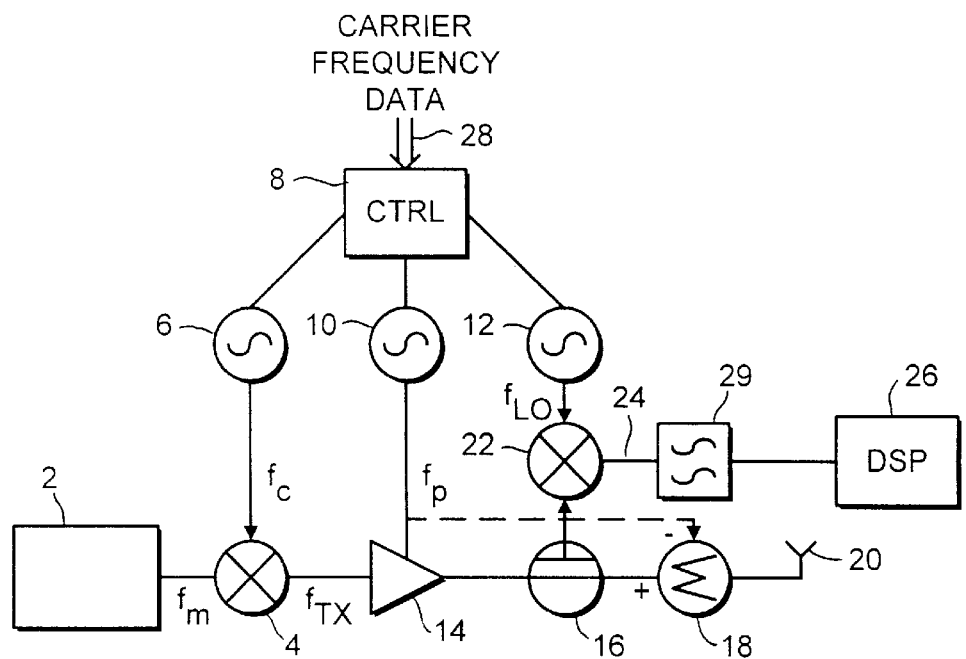
FIG. 3 is a circuit diagram illustrating one example of diagnostics in a linear power amplifier at a transmitter.

FIG. 3 is a circuit diagram of the relevant circuitry within a transmitter which can be located either at the base station BTS or within each mobile station MS. The circuitry comprises a data generator 2 which generates a modulation signal fm having a predetermined bandwidth, for example 5 MHz, and which represents the data to be transmitted. A mixer 4 receives the modulation signal fm and a carrier frequency fc generated by a first oscillator 6. The first oscillator 6 is controlled by a controller 8. The controller 8 also controls a second oscillator 10 which generates a signal at a diagnostic frequency fp and a third oscillator 12 which generates a local oscillator signal LO. A linear power amplifier 14 receives the transmission channel fTX which comprises the carrier frequency fc and the modulation signal fm. The output of the amplifier 14 is supplied via a coupler 16 to a cancellation circuit 18 and finally to an antenna 20 for transmission.

As is known in the art, suitable filters are included. The signal fp generated by the second oscillator 10 acts as a pilot tone for the linear power amplifier 14. Part of the output of the linear power amplifier 14 is extracted at the coupler 16 and supplied to a down conversion circuit 22 which receives the local oscillator signal LO. The down conversion circuit 22 uses the local oscillator signal LO to generate a diagnostic signal 24 at a low intermediate frequency. The diagnostic signal 24 is supplied to a digital signal processor 26 for carrying out diagnostic procedures. The cancellation circuit 18 removes the pilot tone from the transmission signal fTX prior to transmission at the antenna 20.

Figure 4:
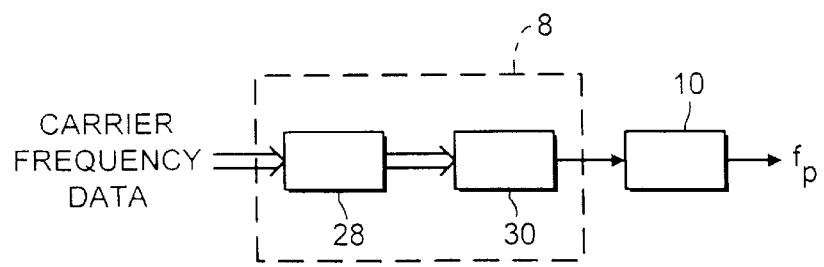
FIG. 4 is a block diagram of the components of a controller for use in the transmitter of FIG. 3.

The controller receives carrier frequency data from a central system on line 28. As illustrated in FIG. 4, this data is used to control the frequency of the pilot tone by controlling the frequency of the oscillation signal generated by the second oscillator 10. The controller 8 selects an appropriate carrier frequency fc for generating the transmission signal fTX in line with the predetermined set up for that particular base station or mobile station. In order to do this, the controller holds information about the bandwidth of the transmission band and the upper and lowermost frequencies of the transmission band, together with information about the transmission channels which are allowed to be used within that band. Control logic 28 analyses this information and determines an appropriate frequency for the pilot tone such that, when the pilot tone is down converted, no other transmission channel in use lies in the image band during down conversion. The appropriate selection made by the control logic 28 is supplied to a frequency synthesizer 30 which controls the second oscillator 10 accordingly.

The frequency of the local oscillator signal LO may also be selected by the controller 8 through control of the third oscillator 12 in order to down convert the pilot signal to a predefined intermediate frequency. This has the advantage that it allows the intermediate frequency to be fixed so that filters such as filter 29 and other circuitry may be set up to operate at a predefined frequency. It also simplifies operation of the digital signal processor 24 to receive a signal at a fixed, predefined frequency.

Figure 5:
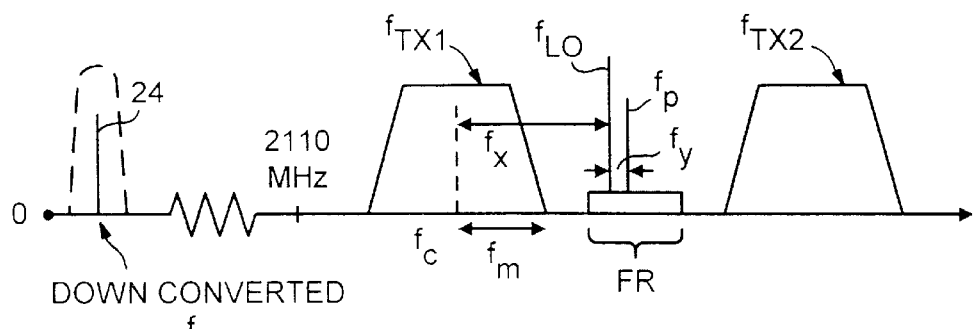
FIG. 5 is one example of frequency selection.

In the described example, selection of the frequencies is carried out by the controller 8 in line with the following:

fc lies in the range 2110 MHz to 2170 MHz each transmission channel has a bandwidth of 5 MHz (fm=2.5 MHz)

fp=fc±(fm+fx), where fx lies for example in the range of 100 KHz to 2.5 MHz for a W-CDMA system fLO=fp±fy, where fy is chosen according to the processing capability of the DSP 26 lies for example in the range of 100 KHz to 1.25 MHz in a W-CDMA system FIG. 5 illustrates one example of selections of the frequencies fc, fp and fLO. In FIG. 5, two transmission channels fTX1 and fTX2 are illustrated, each having a bandwidth of 5 MHz and a carrier frequency fc. FR denotes the frequency range within which fp and fco are selected according to the above described criteria. The down converted diagnostic signal is designated 24 and is surrounded by a dotted line denoting the pass band of the baseband filter. It will be appreciated that the frequency of the down converted diagnostic signal 24 is the difference frequency fy used to generate the downconverting signal fLO for the downconversion circuit 22.

Thus, in the described example, a linearised power amplifier 14 uses a narrow band pilot tone for calibration purposes. The transmit channel fTX can be any of a number of channels inside a wide frequency band (60 MHz as described in the example herein). The calibration tone is placed inside the frequency band for transmission, but cannot overlap the transmission channel itself. Thus, the location of the calibration tone is not fixed, but instead is placed at a frequency which is free from transmission and which has no transmit channel at its image frequency in down conversion, using the available information about the transmit frequency.

Selection of the down converting oscillator frequency fLO can be used for another purpose. That is, the transmission channel fTX itself can be down converted after the linear power amplifier 14 for diagnostic purposes. Thus, consider the situation where it is needed to down convert a single transmit channel at an RF frequency (e.g. in the range 2.11→2.17 GHz) of bandwidth 5 MHz into an intermediate frequency of 7.5 MHz for diagnostic procedures. In addition, consider the case where two transmit channels can be simultaneously present inside a sub band within the transmission band, the sub band having a width of 20 MHz and the transmission band having a width of 60 MHz. FIGS. 6a to 6d illustrate some of the possible combinations of the transmit channels and the frequency of the oscillator signal LO used for down conversion.

Figure 1:
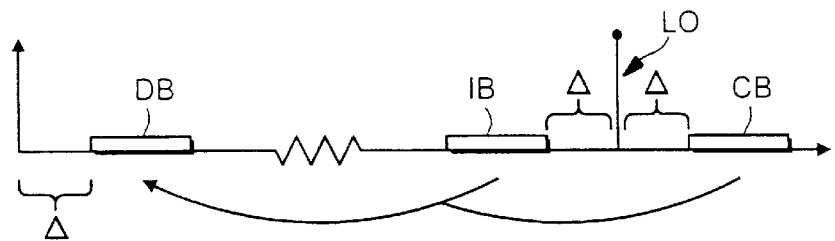
FIG. 1 illustrates the effect of down conversion of a high frequency.
Figure 6A:
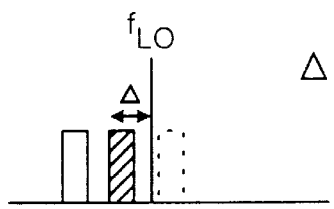
FIGS. 6a to 6d represent different examples for selection of a downconverting local oscillator frequency.
Figure 6C:
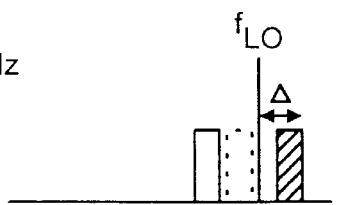
Figure 6B:
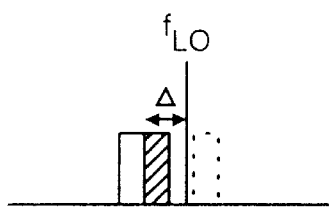

In each case, the local oscillator signal LO is chosen in such a way that there is no other transmit channel at the image frequency of down conversion. As already described, the image frequency lies at the same frequency distance (Δ in FIG. 1) on the other side of the local oscillator signal as the down converted channel. In each of FIGS. 6a to 6d, the transmit channel to be down converted is shown shaded. The image frequency in each case is shown as a dotted line. In each case it can readily be seen that the image frequency does not overlap the other transmission channel which is present in each case. It will be noted that FIGS. 6a and 6b illustrate high injection for the down conversion circuit 22.

Figure 6D:
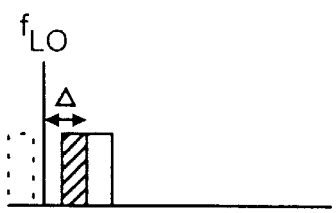

That is the local oscillator signal is at a higher frequency than the channel to be down converted. FIGS. 6c and 6d represent low injection, that is the local oscillator signal is at a frequency lower than that of the channel to be down converted. In each case, the image frequency lies on the other side of the local oscillator signal with respect to the channel to be down converted.

Thus according to this use of the oscillator signal LO, knowledge of a well defined radio environment is used to implement simple and efficient downconversion by arranging the location of the downconverting local oscillator signal suitably. The frequency of the signal fLO involved in downconversion is controlled in such a way that the image rejection in downconversion is maximised without pre-filtering. The transmitter uses the information about the transmit frequencies which is necessary for determining transmission channels. This information is employed to determine where it is best to place the downconverting signal fLo in order to avoid converting down a strong frequency component, that is another transmit channel, as an image frequency.

What is claimed is:

1. A test method in an RF communication system in which at least one RF communication channel lies about a known carrier frequency in an RF communication band, the method comprising:

introducing into circuitry to be tested a diagnostic signal at an RF diagnostic frequency lying within the communication band; and down converting the diagnostic signal to an intermediate frequency for diagnostic purposes after processing by the circuitry to be tested and wherein the diagnostic frequency is selected based on the known carrier frequency of the at least on communication channel such that the communication channel is not at an image frequency of said diagnostic frequency in down conversion and is not down converted with the diagnostic signal.

2. A test method according to claim 1 when operated at a transmitter wherein the diagnostic signal is introduced into transmission circuitry.

3. A test method according to claim 2 wherein the transmission circuitry comprises a linearised power amplifier which processes the at least one communication channel prior to transmission and wherein the diagnostic signal is removed from the communication band prior to transmission.

4. A test method according to claim 1 when operated at a receiver in a diagnostic environment wherein the diagnostic signal is received at receiving circuitry to be tested which also receives the at least one communication channel.

5. A test method according to claim 1, wherein the diagnostic signal is a tone.

6. A test method according to claim 1, wherein the diagnostic signal is a test channel having a bandwidth comparable to a communication channel.

7. A test method according to claim 1 wherein the diagnostic signal is downcoverted using a downconverting signal at a frequency which is selected so that the intermediate frequency is fixed regardless of the diagnostic frequency.

8. A transmitter for an RF communication system comprising:

transmission circuitry for processing communication channels within an RF transmission band prior to transmission;

a controller for selecting the carrier frequency of at least one communication channel for transmission, the carrier frequency lying within an RF communication band, said controller also being operable to select a diagnostic frequency within the RF communication band for introducing a diagnostic signal at the diagnostic frequency into the transmission circuitry for test purposes;

and means for down converting the diagnostic signal to an intermediate frequency for diagnostic purposes after processing by the transmission circuitry wherein the diagnostic frequency is selected based on the known carrier frequency of the at least one communication channel such that the communication channel is not at an image frequency of said diagnostic frequency in down conversion and is not down converted with the diagnostic signal.

9. A transmitter according to claim 8 wherein the controller also selects a downconverting frequency for down converting the diagnostic signal such that the intermediate frequency is fixed regardless of the diagnostic frequency.

10. A transmitter according to claim 8, wherein the transmission circuitry comprises a linearised power amplifier.

11. A transmitter according to claim 8, which comprises circuitry for cancelling the diagnostic signal prior to transmission.

12. A transmitter according to claim 8, which comprises means for modulating the selected carrier frequency with a modulation signal representing data to be transmitted.

* * * * *